April 3, 1962 TETSURO TANAKA ETAL 3,028,564

MECHANICAL FILTER

Filed June 14, 1960

United States Patent Office 3,028,564
Patented Apr. 3, 1962

3,028,564

MECHANICAL FILTER

Tetsuro Tanaka, Sakyo-ku, Kyoto-shi, and Yasuo Tagawa and Katsumasa Kuyama, Tokyo-to, Japan, assignors to Kokusai Denki Kabushiki-Kaisha, Tokyo-to, Japan, a company of Japan Filed June 14, 1960, Ser. No. 36,080
9 Claims. (Cl. 333—72)

This a continuation-in-part of our prior application, Serial No. 611,480, filed September 24, 1956 and now abandoned.

This invention relates generally to filters and more particularly to an improved electromechanical filter usable in electronic apparatus, for example, communication apparatus such as carrier terminal equipment.

In the conventional electromechanical filter heretofore in use, which is made by connection of many mechanical resonators coupled by coupling elements, the transducers in the filter are usually made of a material having the property of magnetostriction such as nickel. Such a filter requires a bias magnet and a driving coil. The known filters of the above-mentioned type have the disadvantage that the manufacture of a filter of small dimensions is not possible and it is difficult to use the filter in conditions where maximum conversion efficiency is required as frequencies increase since eddy current loss and hysteresis loss increase as the frequency increases.

Compared with the above-mentioned type of transducer a transducer made of a material such as barium titanate, crystallized quartz or Rochelle salt, all of which have the property of electrostriction, has the advantage that the conversion efficiency of the transducer is higher than that of the first-mentioned type of transducer. The pass-band frequency characteristic and temperature coefficient of the latter type transducer are relatively good, its mechanical strength is large in proportion to its size and the size of the transducer is smaller than other transducers in proportion to the band width handled without decrease of conversion efficiency and the latter type transducer may be used without using any bias flux device.

A principal object of this invention is to provide an electromechanical filter free of the disadvantage of the conventional mechanical filter heretofore in use as described above.

Another object of the invention is to provide an electromechanical filter in which transducers and mechanical resonators form a vibrating system thereof which is supported by using gum support means having excellent stability and capable of supporting the vibrating system of the filter substantially without mechanical resistance to vibration as compared with the mechanical resistance or damping effect which results from the use of known viscolloid or low Q material used as a termination damper.

A feature of the electromechanical filter according to the invention is that the filter is a multi-section filter in which mechanical resonators are arranged in two groups or sections with the resonators forming a given group or section being disposed in substantial parallelism and the two sections are substantially parallel. Each section forms a wave propagation path or transmission path along which wave propagation takes place in a respective direction of propagation for each section. The direction of wave propagation in these sections is in opposite directions and takes place alternately in opposite directions so that filtering action can take place in a very limited area or space making it possible to make the filter according to the invention very compact and with a steep cut-off characteristic normally associated with filters in which the resonators are "strung out" in series and which consequently cannot be made compact.

In order to carry out the wave propagation in opposite directions in the multi-section filter of the invention mechanical resonators forming the sections are mechanically coupled with longitudinally rigid coupling elements in the form of pins for propagating oscillations alternately in these sections and the resonators are coupled so that they carry out a turning action or alternatively the coupling means between the sections includes a turning resonator so that wave propagation in the various embodiments of the invention can take place in opposite directions in the sections.

Another feature of the invention is that input and output electromechanical transducers are employed as end resonators of a vibrating system formed by the respective mechanical resonators of the sections which in conjunction with the fact that the transducers exhibit electrostriction characteristics and are made smaller than magnetostrictive transducers, without loss of efficiency, makes it possible to construct a filter greatly reduced in size and still capable of carrying out filtering action similar to larger filters and with great attenuation of frequencies immediately beside the pass-band.

Other features and advantages of the electromechanical filter in accordance with the present invention will be better understood as described in the following specification and appended claims, in conjunction with the following drawings, in which:

Figure 1:
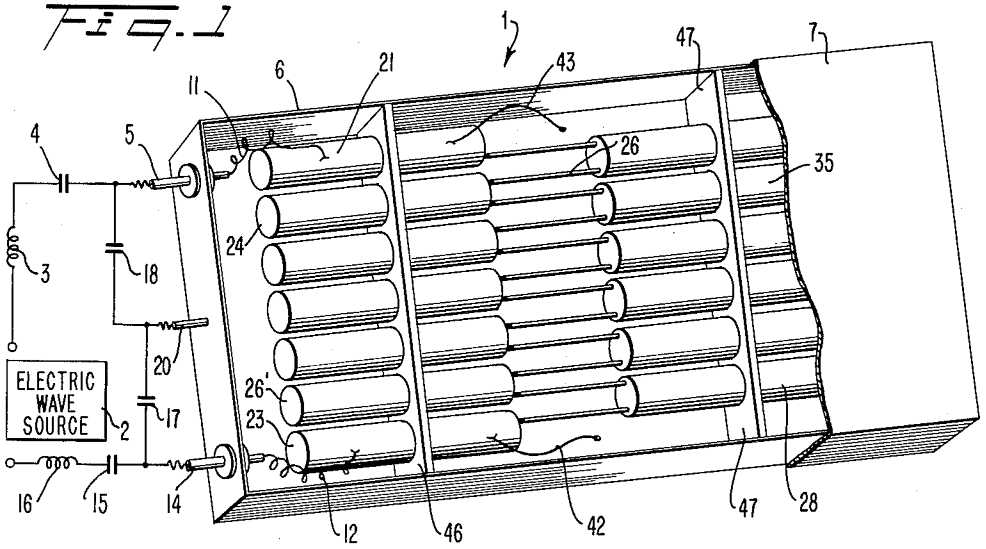
FIG. 1 is a perspective cut-away view of an embodiment of a multi-section filter according to the invention.
Figure 2:
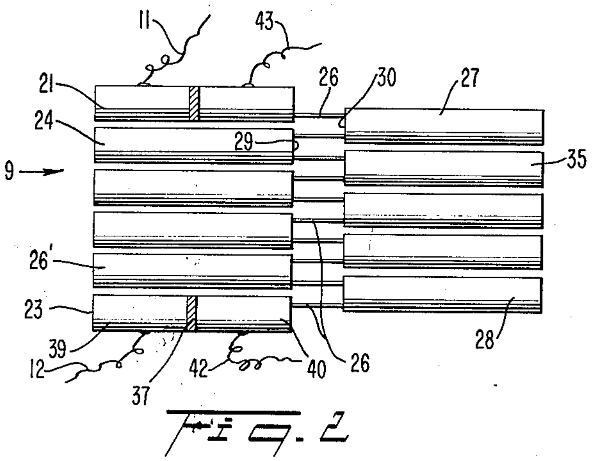
FIG. 2 is a plan view of an array of resonators forming a vibrating system of the filter shown in FIG. 1.

Referring to FIGS. 1 and 2 a filter 1 according to the invention receives an electrical signal to be filtered from an electric wave source, shown schematically as a block 2, through an input inductance 3 in series with an input capacitance 4 electrically connected to a terminal 5 on a case 6 of the filter 1 having a cover 7 shown cut-away for viewing an internal vibrating system 9 electrically connected to terminal 5 through a lead 11 and having an output lead 12 connected to a terminal 14 in series with an output capacitor 15 and output inductance 16. A pair of capacitors 17, 18 are connected across the input and output connections and to a ground terminal 20.

The vibrating system 9 of the filter 1 carries out the filtering action and consists of an input electromechanical transducer 21 for receiving the electrical input energy as electrical waves or oscillations through the input lead 11 and converting the wave energy to mechanical oscillations and propagating them through the vibrating system to an output electromechanical transducer 23 to which the output lead 12 is connected. The mechanical vibrations or oscillations are converted to electrical energy by the output electromechanical transducer 23 so that the electrical output corresponds to a preselected frequency of a pass-band for which the vibrating system 9 is designed.

In order to carry out filtering action the vibrating system of the filter 1 comprises a plurality of longitudinal resonators 24, 26 and those shown disposed intermediate them, arranged in parallel relationship forming a first section of the filter and a second group or section is formed by a plurality of longitudinal resonators 27, 28 and the resonators disposed between them, arranged in a parallel relationship as shown. The input electrical oscillations converted to mechanical oscillations by transducer means 21 are propagated as later herein explained, alternately in opposite directions between the left hand group of resonators such as mechanical resonators 24, 26 and the right hand group or section of resonators such as resonators 27, 28 through coupling means comprising longitudinal rigid coupling elements in the form of pins 26 soldered or otherwise welded to the respective end faces of the resonators as for example, the end faces 29, 30 of the mechanical resonators 24 and 27 respectively.

The pins 26 are cut to a proper length for the resonance characteristics of the rejector resonators intermediate the electromechanical transducers.

Since the vibration or oscillation amplitude of the end faces, for example, the end faces 29, 30 is the same as that of the bar portion of the resonators the vibration characteristics of the assembly have no relation to the coupling position of the coupling pins or elements 26. However, preferably in the present embodiment the coupling elements 26 are connected at points radially spaced from the central region of the resonators corresponding to the longitudinal axis thereof at points symmetrical to the longitudinal axis whereby a mechanical balance of the total structure is assured. It will be understood that each of the resonators has a preselected resonance frequency and the resonance frequencies are equal. The vibrating system 9 is mounted in a manner herein later disclosed with the ends of the resonators opposite to the connections or faces coupled to the pins 26 mechanically free so that the resonators are free to resonate or oscillate in the longitudinal mode freely thus making the frequency control of the resonators relatively easy.

The mechanical coupling elements or pins 26 are connected with successive pairs of these wires coupling successive ones of the resonators in the sections so that wave propagation through the sections or paths of the filters takes place alternately in opposite directions. Thus the electromechanical transducer 21 propagates waves in the direction of mechanical resonator 27 which resonates and propagates waves in an opposite direction toward resonator 25 which in turn is coupled to a resonator 35 and causes it to resonate so that propagation of waves takes place in opposite directions in the two sections alternately with the final output being taken out at electromechanical transducer 23.

The electromechanical transducers 21, 23 are connected to the filter sections or one of the sections thereof so that they constitute end resonators of the vibrating system thereby materially assisting in making it possible to construct the resonator according to the invention in a very compact arrangement.

Figure 3:
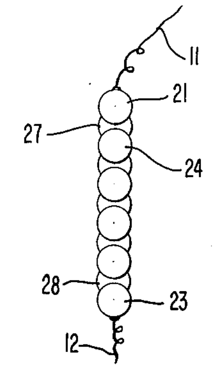
FIG. 3 is a diagrammatic view illustrating a coplanar relationship of the resonators forming the vibrating system of FIG. 2.
Figure 4:
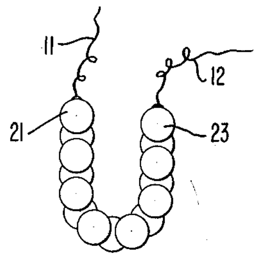
FIG. 4 is a diagrammatic view illustrating how the resonators of FIG. 2 may be arranged in a U-shaped configuration or array.

The resonators of the two sections according to the present embodiment are disposed extending parallel to each other within the respective sections and the two sections are parallel with respect to each other with the resonators of one section disposed axially with respect to the resonators of the other section and have their longitudinal axis offset in the manner shown in FIGS. 2 and 3 in a coplanar array thereby resulting in a compact arrangement. In this manner the end faces of the resonators to which the coupling pins 26 are soldered or otherwise secured are disposed opposite each other and the end faces of the resonators of a respective group are disposed substantially in parallelism. It will be understood that the arrangement of the vibrating system resonators can be U-shaped in the manner shown in FIG. 4 or other types of arrays or configurations employed so that the filter can be minified.

The electromechanical transducers are preferably constructed so that they exhibit the property of electrostriction. The transducers are made of a central element 37 having the property of electrostriction and preferably constituting a piece made of barium titanate ceramic disposed between two metal end pieces 39, 40 made of a high-speed steel or nickel alloy so that the transducers can be made relatively small and have a maximum conversion efficiency and optimum temperature coefficient as indicated heretofore. The transducers are grounded to the filter case by leads 42, 43. The diameter and length of the transducers are so chosen that each transducer acts as an end resonator for a section of the filter.

The pins 26 coupling the end faces of the transducers to the respective resonators 27, 28 are connected to the transducers by means of a tapped and threaded connection so that the depth of the connection, and therefore the axial length of the coupling pins, can be controllably varied and the axial movement of the pins 26 controlled at this point for about a distance of two millimeters thereby to provide minute and precise adjustment of the frequency band or pass band of the respective section.

It will be understood that other materials may be used for the piece 37 as for example crystallized quartz or Rochelle salt, however, the construction of transducers using these two materials is more difficult than those using barium titanate ceramic since these materials are not artificial materials and it is preferable to make this type of transducer when using these non-artificial materials as an end section bonded to a resonator, not shown.

Figure 5:
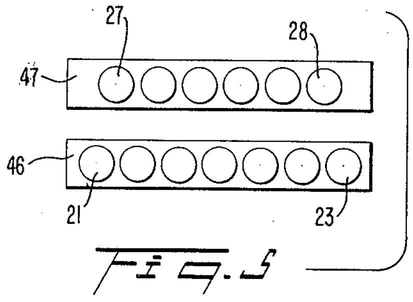
FIG. 5 is an elevation view of gum mounting means for mounting the vibrating system of FIG. 2 in position in the filter as shown in FIG. 1 so that it can vibrate or resonate freely to carry out filter action.

The vibrating system 9 is supported by supporting the transducers and resonators in vibration dampers made of viscolloid but this damper is inferior in its stability characteristics and other properties so that the filter is not as stable as it should be. According to the invention the filter vibrating system is preferably supported by gum means which has high stability and vibration proof properties. In the present embodiment the resonators and transducers are supported by strips of silicone rubber 46, 47 extending transversely of the filter case and secured thereto and shown diagrammatically in elevation view separately in FIG. 5 illustrating the manner in which the transducers and resonators extend axially transversely of the two strips.

In the example illustrated it is assumed the wave length of the coupling wires and the mechanical resonators is a quarter wave length but it will be understood that the wave length may be one quarter, one eighth, etc. and the diameter and length of the transducers and mechanical resonators and the natural resonance frequency of mechanical oscillation thereof is predetermined and so chosen as to function for the frequencies or pass band of the filter.

It will be understood by those skilled in the art that the gum supports are intended to keep the coupling pins from bending in the event the number of resonators is increased and it is not necessary that the gum support strips 46, 47 hold the resonators snugly circumferentially at all points and it is possible to have the gum support means provided with a plurality of radially inwardly extending projections, not shown, in the inner surface of the holes thereof thereby holding the resonators at points angularly spaced circumferentially on the resonators. Moreover, if a bonding agent is used between the resonators and transducers and the gum supports care must be taken not to affect the resonance characteristic of the various elements affected. The bonding agent may be applied on a small area corresponding to the nodal point of oscillation.

The use of silicone rubber material in the support means results in the support being very stable to heat and humidity so that spurious vibrations and noise will not affect the frequency pass band characteristic of the filter.

While preferred embodiments of the invention have been shown and described, it will be understood that many modifications and changes can be made within the scope of the invention.

What we claim and desire to secure by Letters Patent is:

1. In an electromechanical wave filter comprising two resonant first and second sections each comprising a plurality of spaced mechanical resonator elements disposed in substantial parallelism and defining two parallel, resonant transmission paths with each section corresponding to one of said paths and each section having a given resonance frequency, input electromechanical transducer means mechanically coupled to one of said sections for receiving and converting input electrical oscillations to said filter into mechanical oscillations and output electromechanical transducer means coupled to one of said sections to receive mechanical oscillations of a preselected frequency band after passing through both sections for conversion to electrical oscillations as an output of the filter, each mechanical resonator element having a predetermined resonance frequency of mechanical oscillation, means mechanically coupling the resonator elements in respective body portions thereof to cause said resonators to function as turning elements and as resonators in respective ones of said sections and disposed for causing both of the sections to resonate when input electrical oscillations are applied to the input transducer means and to vibrate in different respective directions of wave propagation to propagate waves through the filter along said paths and through said sections in opposite directions of propagation.

2. In an electromechanical wave filter according to claim 1, in which said resonator elements in each of the sections comprise spaced longitudinal rods in parallelism and the rods of one section are disposed axially spaced from the rods of the other section, and in which said mechanical coupling means comprise a plurality of longitudinally rigid coupling elements for oscillating the resonators in the longitudinal direction of said rigid coupling elements, and said rigid coupling elements disposed coupling oppositely disposed faces of the resonators of the two sections thereby to cause the resonators to function as turning elements and resonators.

3. In an electromechanical wave filter according to claim 2, in which the end faces of the resonators of a respective section are disposed substantially parallel and in which said rigid coupling elements are in the form of pins connected at opposite ends at points offset from the central region of the end faces of the resonators and connecting the resonators of the sections so that wave propagation is alternately through an individual resonator of one section and a resonator of the other section.

4. In an electromechanical wave filter according to claim 2, in which the resonator elements are arranged in a coplanar array.

5. In an electromechanical wave filter according to claim 2, in which the resonator elements are arranged in a substantially U-shaped array.

6. In an electromechanical wave filter according to claim 1, in which said resonator elements in each of the sections comprise axially spaced longitudinal rods and the rods of one section are disposed in substantial parallelism with the rods of the other section, and in which said mechanical coupling means comprise a plurality of longitudinally rigid coupling elements for subjecting the resonators to vibration in the longitudinal direction of said rigid coupling elements, and said rigid coupling elements coupling the resonators of the respective sections in series.

7. In an electromechanical wave filter according to claim 6, in which said rigid coupling elements are in the form of pins connected at opposite ends at points coaxial with the central region of the end faces of the resonators and including wires connecting the resonators of the sections to said turning means so that wave progagation is in one direction through one section and in an opposite direction in the other section.

8. In an electromechanical wave filter comprising two resonant first and second sections each comprising a plurality of spaced mechanical resonator elements disposed in substantial parallelism and defining two parallel, resonant transmission paths with each section corresponding to one of said paths and each section having a given resonance frequency, input electromechanical transducer means mechanically coupled to one of said sections for receiving and converting input electrical oscillations to said filter into mechanical oscillations and output electromechanical transducer means coupled to one of said sections to receive mechanical oscillations of a preselected frequency band after passing through both sections for conversion to electrical oscillations as an output of the filter, each mechanical resonator element having a predetermined natural resonance frequency of mechanical oscillation, means mechanically coupling the resonator elements in respective body portions thereof to cause said resonators to function as turning elements and as resonators in respective ones of said sections and disposed for causing both of the sections to resonate when input electrical oscillations are initially applied to the input transducer means and to vibrate in different respective directions of wave propagation to propagate waves through the filter along said paths and through said sections in opposite directions of propagation, and the transducer means being disposed spaced in substantial parallelism.

9. In an electromechanical wave filter comprising two resonant first and second sections each comprising a plurality of spaced mechanical resonator elements disposed in substantial parallelism and defining two parallel, resonant transmission paths with each section corresponding to one of said paths and each section having a given resonance frequency, input electromechanical transducer means mechanically coupled to one of said sections for receiving and converting input electrical oscillations to said filter into mechanical oscillations and output electromechanical transducer means coupled to one of said sections to receive mechanical oscillations of a preselected frequency band after passing through both sections for conversion to electrical oscillations as an output of the filter, each mechanical resonator element having a predetermined natural frequency of mechanical oscillation, means mechanically coupling the resonator elements in respective body portions thereof to cause said resonators to function as turning elements and as resonators in respective ones of said sections and disposed for causing both of the sections to resonate alternately at least initially when input electrical oscillations are applied to the input transducer means to vibrate in respective directions of wave propagation to propagate waves through the filter along said paths and through said sections in opposite directions of propagation, and the transducer means being disposed spaced in substantial parallelism.

References Cited in the file of this patent

UNITED STATES PATENTS

| | | |
|---|---|---|
| 2,615,981 | Doelz | Oct. 28, 1952 |
| 2,695,357 | Donley | Nov. 23, 1954 |
| 2,712,753 | Campbell | July 12, 1955 |
| 2,762,985 | George | Sept. 11, 1956 |
| 2,774,035 | Richmond et al. | Dec. 11, 1956 |
| 2,803,803 | Jonker et al. | Aug. 20, 1957 |
| 2,821,686 | Burns | Jan. 28, 1958 |